United States Patent [19]
Matern

[11] 3,802,096
[45] Apr. 9, 1974

[54] COMPOSITE MODEL FOR MEDICAL STUDY

[76] Inventor: Helen A. Matern, 452 Blaine Ave., Salt Lake City, Utah 84115

[22] Filed: Oct. 10, 1972

[21] Appl. No.: 295,895

Related U.S. Application Data

[63] Continuation-in-part of Ser. No. 169,921, Aug. 9, 1971, abandoned.

[52] U.S. Cl. .................................................. 35/17
[51] Int. Cl. ........................................... G09b 23/30
[58] Field of Search .................................. 35/17, 51

[56] References Cited
UNITED STATES PATENTS
1,951,422  3/1934  Klemperer ........................... 35/17
2,988,823  6/1961  Rosenbloom ......................... 35/17

OTHER PUBLICATIONS

Denoyer–Geppert Co., Biology Catalog 21B, 1946–1947, Page 8, Urinary Apparatus Y45.
Carolina Biological Supply Co., Catalogue No. 37, July 1967, page 491 only
Clay–Adams Catalog No. 105, 1953, pp. 162, 166, 170
Stansi Scientific Division Cat. Q185F54, Feb. 1969, page 41 only
"Juno" Cleveland Health Museum Booklet, Nov. 1961, R. 891 C5M3, pp. 12, 13

*Primary Examiner*—Harland S. Skogquist

[57] ABSTRACT

A model for medical studies depicting the blood supply and drainage systems of the head, leading to and from the heart. The model includes a head shell which preferably is open at one side so that spacial relationships of the various arteries and major veins may be clearly perceived. The head shell is preferably transparent. Structure simultating dura tissue enclosures are also used.

12 Claims, 7 Drawing Figures

PATENTED APR 9 1974 3,802,096
SHEET 1 OF 3
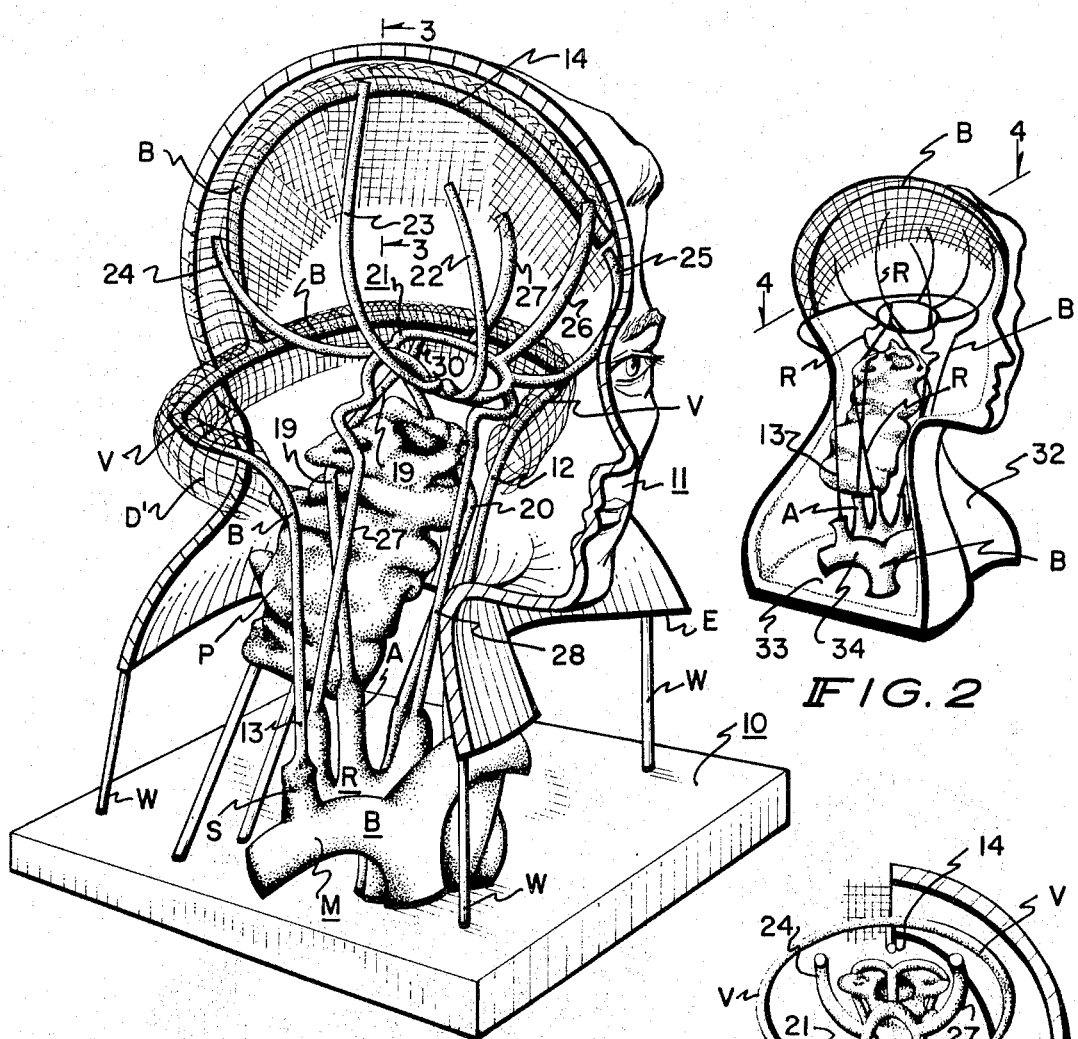
FIG.1
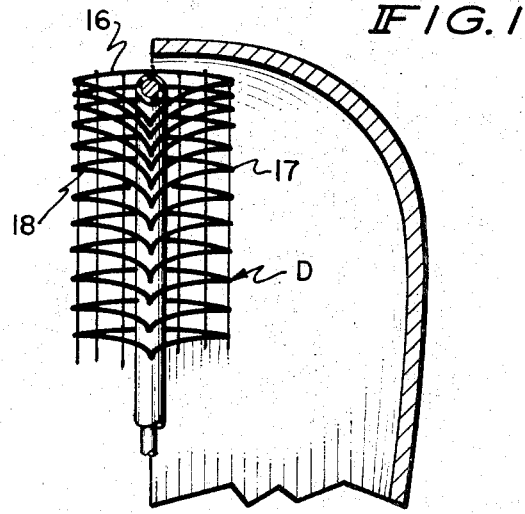
FIG.3
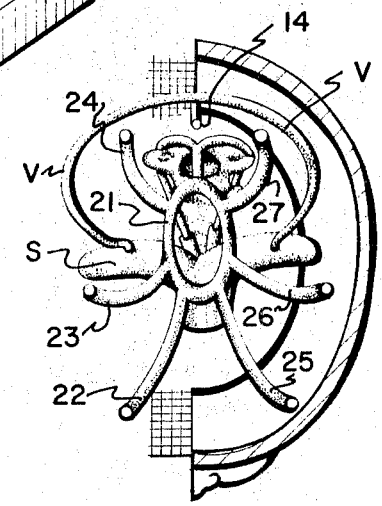
FIG.2
FIG.4
INVENTOR.
Helen A. Matern
BY
Her Attorney

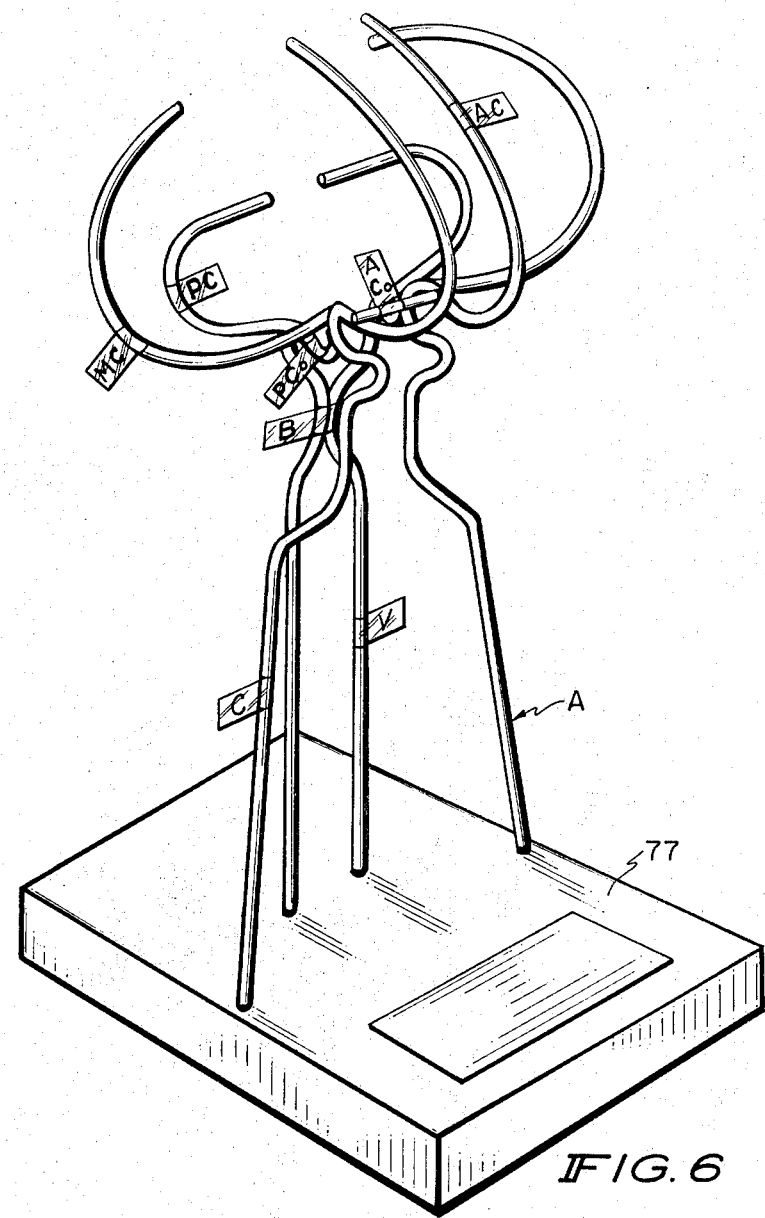

FIG. 6

| BASIC INTERNAL CEREBRAL VASCULAR CIRCULATION ||||
| --- | --- | --- | --- |
| ARTERIES | S——SKULL, Top Portion<br>DM—DURA MATER | | VEINS & DRAINAGE<br>PATHWAYS |
| C————Internal Carotid<br>V—————Vertebral<br>(Circle of Willis)<br>B——————Basilar<br>PC——Posterior Cerebral<br>PCo Posterior Communicating<br>MC——————Middle Cerebral<br>ACo Anterior Communicating<br>AC——Anterior Cerebral | F—————Falx Cerebri<br>T—————Tentorium<br>CRANIAL FOSSAE<br>AF——————Anterior<br>MF——————Middle<br>PF——————Posterior<br>CERVICAL VERTEBRAE<br>D———————Disk<br>S————Spinous Process<br>B———————Body | | SS————Superior<br>Longitudinal<br>Sinus<br>LS————Lateral Sinus<br>J————Interior Jugular<br><br>FOR NURSING, ANATOMY<br>AND HOSPITAL CLASS |

FIG. 7

COMPOSITE MODEL FOR MEDICAL STUDY

This is a continuation-in-part of the inventor's copending, and now abandoned, patent application entitled "Model for Medical Study," Ser. No. 169,921, filed Aug. 9, 1971.

The present invention relates to medical models, and, more particularly, provides a model of the head and upper portion of the body wherein there is depicted, in easily discernible spacial relationships, the various arteries and major veins of the area. The model depicts the circulatory flow system from the aorta of the heart up through the brain, down the blood drainage system, back to the superior vena cava of the heart.

In the past, a number of medical models have been devised for various purposes. None, to the inventor's knowledge, has depicted the blood circulatory system as between the heart and brain areas of the body. This area is particularly difficult to visualize by medical students since important spacial relationships as between the various veins and arteries and other physiology is most difficult to perceive.

The model of the present invention includes preferably a half-shell of the skull and outer head area which are transparent, the remaining portion being open and essentially free of obstruction, excepting, of course, for those anatomy portions which are important to depict, such as the aorta, the superior vena cava, the upper spinal cord, and the various major blood vessels.

In the present invention, the student can easily perceive, through color-coding, the arterial system and also the venous system, and also can clearly see the relationship of various vessels to each other and to the upper spinal column, for example. A protective tissue known as the dura, a menix, may be represented by screening that encases the parts simulating the various veins as hereinafter explained.

The base of the model may be made integral with the shell, or, in another embodiment, may support the shell and various blood vessels and other structure.

Accordingly, a principal object of the present invention is to provide a new and improved medical model for examination and study by medical, primarily nursing, personnel.

A further object of the invention is to provide a model relating to the head wherein the arterial and venous systems are clearly perceived as to important branches and mutual spacial relationships.

A further object of the invention is to provide a model of the head region of an individual, which model is self-supporting.

A further object is to provide a model wherein important tissue encasing the superior sagittal vein, for example, is easily typified in an inexpensive way without detracting from visibility of such vein.

An additional object is to provide the model of a head illustrating arterial and venous systems proximate the circle of Willis and/or the upper part of the spinal column.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view of one form of the invention.

FIG. 2 is a perspective view showing reduced scale of another form of the invention wherein the base of the model is made integral with the shell forming the head.

FIG. 3 is an enlarged fragmentary view taken along the line 3—3 in FIG. 1, illustrating the dura covering of the superior sagittal vein, by way of example.

FIG. 4 is a horizontal section taken along the line 4—4 in FIG. 2, illustrating in top plan the major portion of the venous and arterial systems of the brain.

FIG. 6 is similar to FIG. 5, but illustrates solely the arterial system of FIG. 5.

FIG. 7 is a top plan of a nomenclature plate that is useful for inclusion in the structure of either FIG. 5 or FIG. 6.

Figure 5:
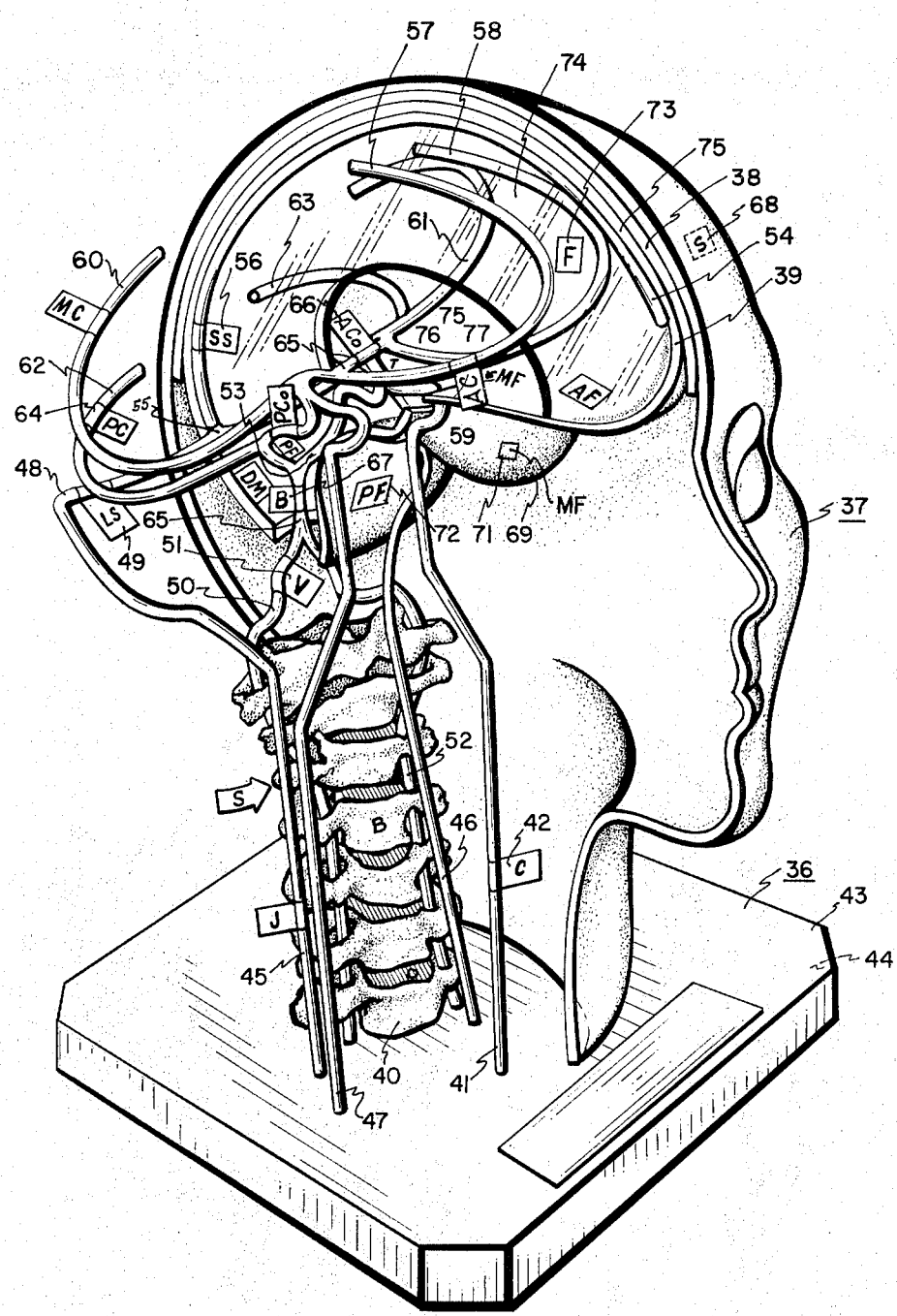
FIG. 5 is a perspective view of a medical model, in one embodiment of the present invention, showing the various parts and spatial relationships pertaining to the blood circulatory system found in the human head.

Throught the description which follows, reference to a vein, artery, or vein structure shall refer to structures simulating the corresponding arteries or veins in the human body. Such "vein" or "artery" may be made of tubing, wire, or wrapped or coated wire to illustrate, by color-coding, a differentiation of the arterial and venous systems.

In FIG. 1, the base 10 is provided for the model and includes upstanding wire legs W which support head contour shell 11.

Contour shell 11 preferably comprises a half-shell constructed, as for example, where a longitudinally oriented vertical plane passes through an imagined, complete shell enclosure.

Contour shell 11 is made of any moldable substance, and preferably comprises a transparent plastic shell. The wires or supports W may be designed to protrude into the support 10 and into the lower edges E of the contour shell 11. Molded portion M simulates the superior vena cava leading to the heart and includes, upstanding therefrom, jugular veins 12 and 13 which laterally extend, as the lateral sinus vena V, around in an arcuate configuration leading to juncture J. The latter is conventionally referred to as the torcular Herophili. The juncture J forms a connection to the large top vein 14 which is referred to as the superior sagittal vein. The latter serves as a venous drainage for the entire brain area. The jugular veins, of course, descend into the superior vena cava leading to the heart entering at S.

The superior sagittal vein is encased in top and side wire structures 16, 17 and 18 which preferably are of an inter-meshing structure, mutally joined together. The wire mesh 16-18 simulates the tough fibrous tissue, called "the dura", encasing the superior sagittal vein.

Portion A in FIG. 1 simulates the aorta coming from the heart.

Members 19 and 20 simulate the respective vertebral arteries proximate upper spine portion P. These lead up to complex loop structure 21 simulating the circle of Willis.

Rising from the circle of Willis on the right-hand side of the model's head are members 22, 23 and 24 which simulate the anterior cerebral artery, the middle cerebral artery, and the posterior cerebral artery, respectively. Corresponding members 25–27 are found on the left side of the model and represent the anterior, middle and posterior cerebral arteries for the left side of the model's head.

Depending from the circle of Willis 21 are the carotid arteries 28 and 29. These come from the aorta, leading from the heart, whcih is illustrated at A. Portion 30 denotes the basilar artery which connects the two vertebral arteries to the circle of Willis 21.

FIG. 2 is similar to the structure of FIG. 1 with the exception that the upper shell 32 is made integral with a base 33. The latter, of course, supports the heart region 34 as simulated plus the wire structure. For convenience as to both models, it is preferable that the aorta A be colored red as indicated by the letter R. Correspondingly, the superior vena cava is preferably colored blue (B) to indicate the venous system. It likewise becomes useful for the entire arterial system to be colored red (R) as previously described and as illustrated in FIG. 2, with the remaining or venous drainage system being colored blue (B).

FIG. 3 indicates the dura encasement for the superior sagittal vein, and corresponding wire-mesh structure may likewise be used at D' in FIG. 1 for the jugular vein extensions leading to the lateral sinus venus.

FIG. 4 is a top plan of the arterial and venous structure heretofore described, illustrating the space positioning of the various arteries and veins above described and leading from the circle of Willis 21.

In FIGS. 5 and 6 optional and modified models are illustrated. Upstanding from base 36 in FIG. 5 is a transparent shell 37 forming half of the outer contour of a human head.

Disposed within shell 37 is a plastic segment 38, forming a layer and representing the top portion of a human skull. Interior of the skull representation at 38 is a dura membrane representation 39, the latter also preferably being formed of plastic. In the model representation indicated, but half of the "head" is shown, this so that spacial relationships can easily be both depicted and also clearly seen.

The upper portion of the spinal column, namely, the top seven cervical vertebrae are seen at 40. These latter may be formed by a conventional molding process using an appropriate plastic or resin, by way of example.

Likewise upstanding from and secured to base 36 are a series of rigid or semi-rigid, formed, elongate members such as color coded wires, the same representing the arterial and venous systems located proximate the head area. Thus, member 41 represents the internal carotid and may be labeled by a letter tag 42 for easy identification. With reference to the latter, a nomenclature plate 43 as depicted in FIG. 7 may be attached as by an adhesive or other means to the upper surface 44 of base 36. Thus, the user may easily perceive by the letter indications on the various members, as by tags 42, the actual identification of such members by referring to plate 43. Elongate members 45 and 46 represent the two internal jugular veins. Member 47 represents the remaining internal carotid. Since actually the internal carotid structure is all unitary, but a single letter tag is used, see the letter indication C at tag 42 in FIG. 5. Lateral sinus 48 is shown in FIG. 5, and attached thereto is a plastic lettered tag 49 bearing the letters LS. Member 50 represents a respective one of the vertebral arteries and is given an identification tag 51.

The opposite vertebral artery is indicated at 52 in FIG. 5. The vertebral artery members at 50 and 52, of course, extend upwardly to the area known as the circle of Willis, represented at 53. Elongate member 54, representing the superior sagittal vein, otherwise known as the superior longitudinal sinus, proceeds underneath the upper portion of the skull and dura and down to the juncture known as the torcular Herophili, identified at 55. The superior longitudinal sinus is identified by tag 56, having letter identifications SS corresponding to those found on the identification plate 43. Arcuate members 57 and 58 form representations of the anterior cerebral arteries one or both of which may be identified by tag 59 showing the numerals AC. Arcuately formed members 60 and 61 represent both middle cerebral arteries, both of which join to the circle of Willis.

The posterior cerebral arteries are depicted by arcuately formed members 62 and 63, one or both of which may be given an identifying tag 64 having, by way of example, the letters PC. The anterior cerebral arteries, of course, are joined by the Anterior-Communicating which is identified in the drawing by the numeral 65, and bears identifying tag 66 having the letters ACo thereon. The basilar artery is identified by the numeral 67 and may include an appropriate identifying tag as at 66.

Other various parts and portions of the model may similarly be appropriately identified or tagged by patches or tags. Thus, a plastic patch bearing the letter S, at 68 in FIG. 5, may be implaced directly on the skull representation 38, to be perceived through the transparent shell 37. For convenience of illustration, the lower portion of the skull is not illustrated. However, its dura covering may include letter representations at 69, representing the anterior cranial fossa, and patch (MF) 71 representing the general location of the middle fossa. Similarly, plastic patch 72 bears the letters PF and represents the general location of the posterior fossa.

In connection with the superior longitudinal sinus at 54, it will be understood that the same is encased by the dura proximate the upper portion of the falx and skull. The patch F at 73 may be affixed to transparent member 47 representing the falx. The lower periphery thereof is defined by line 75 in FIG. 5 of the drawings. It will be understood that the falx forms a part of the dura, specifically the inner layer thereof, as the falx proceeds upwardly and laterally so that the superior longitudinal sinus actually nestles in a recess 75.

Incorporation and use of the falx representation is optional. However, it is preferred that the same be employed so that an exact representation may be given of the falx and its association with the remainder of the dura together with its association with the superior longitudinal sinus.

At the middle portion of the model a plastic patch 76 identified the tentorium 77. This likewise is formed from the inner portion of the dura and is cradled in the middle fossa and extends rearwardly in the usual, representative manner.

An important point in the present invention as above described in connection with the embodiments shown in FIG. 5 is that by construction of the model as illustrated, a quite accurate representation of the actual condition and structure in the human head may be shown and spacial relationships of the various parts clearly perceived. Thus, there is not only indicated the spacial relationships of the various arteries and veins but also of the membranous structure such as the dura relative thereto. Also, the location and seating of the superior sagittal sinus may be clearly perceived by the same nesting in the groove between the falx and the dura at the upper portion of the head.

In FIG. 6, solely the arterial system of FIG. 5 is employed. The same, identified by the letter A, is mounted to base 77 with the various arteries being identified as hereinbefore explained relative to FIG. 5. In the case of FIG. 6, a nomenclature plate may likewise be used, but this time solely the left-hand portion of the plate pertaining to the arteries need be depicted. Thus, in the case of FIG. 6 the arterial system A is separately identified and preferably the wires used are color-coded red.

In the model in FIG. 5, in contrast, the arterial system will be color-coded red whereas, preferably, the venous will be color-coded blue.

In FIG. 7 lettering disposed thereon indicates the basic internal cerebral vascular circulation system. The arteries, veins, as well as other portions of the structure are appropriately identified, with letters used corresponding to the letters found on the various patches and tags.

What is provided, hence, is a unique type of model wherein the spacial relationship of various arteries and veins associated with the head of an individual are simulated for convenient perception by students and other medical personnel.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A medical model depicting blood supply and drainage systems of the head area of a human being, including, in combination, a base, a transparent, half head shell supported above said base, said head shell being open on one side, first structure depicting the entire circle of Willis disposed medially within said shell and protruding out of said shell beyond said open one side, means supporting said first structure above said base, second structure simulating the superior sagittal vein disposed longitudinally along and within said shell at an upper area therein, color-coded vein simulating means connected to said second structure and directly mounted to said base, and color-coded arterial simulating means connected to said first structure and directly mounted to said base.

2. The model of claim 1 wherein said model includes third structure simulating the upper portion of the spinal column of a human being, said third structure being supported from and above said base, said arterial simulating means including means simulating vertebral arteries disposed proximate said third structure in accordance with the positioning of the vertebral arteries of a human being relative to his upper spinal column.

3. Structure according to claim 1 wherein screen-mesh structure encases said second structure simulating said superior sagittal vein, whereby to simulate the dura tissue structure of a human being proximate this area.

4. Structure according to claim 1 wherein screening encases portions of said vein simulating means, visually suggesting the tissue enclosure of a portion of said vein simulating means.

5. Structure according to claim 1 wherein said base forms an integral part of said head shell, being supportive thereof.

6. The model of claim 1 wherein said model includes fourth structure simulating the aorta and superior vena cava of the heart, said structure being mounted to said base, said vein simulating means and arterial simulating means being connected to and supported by said fourth structure.

7. Structure according to claim 1 wherein said arterial simulating means includes structural branches simulating the anterior, middle and posterior cerebral arteries.

8. Structure according to claim 1 wherein said vein simulating means include jugular veins coupled to said superior sagittal vein second structure.

9. A medical model depicting blood supply and drainage systems of the head area of a human being, including, in combination, a base; a transparent shell, representing essentially half of the head, supported above said base, said shell being, at least in part, open on one side; first structure depicting the complete circle of Willis disposed medially with respect to said shell and protruding laterally outwardly therefrom; second structure, representing the arterial system of the head area, integral with and depending from said first structure and supportively attached to said base; and third structure representing the venous system proximate the said head area, upstanding from and supportively attached to said base.

10. Structure according to claim 9 wherein said model also includes a vertically oriented, transparent falx representation, said third structure including an elongate portion, representing the superior sinus, disposed proximate said falx representation at an upper region thereof.

11. Structure according to claim 9 wherein said model includes formed structure, representing the tentorium, disposed medially within said shell.

12. Structure according to claim 9 wherein said second and third structures comprise formed wires which include plural tag identification indicia extending laterally therefrom.

* * * * *